US012777240B2

(12) United States Patent
Zhu et al.

(10) Patent No.: US 12,777,240 B2
(45) Date of Patent: Oct. 27, 2026

(54) CAMERA MODULE AND ELECTRONIC DEVICE

(71) Applicant: HONOR DEVICE CO., LTD., Shenzhen (CN)

(72) Inventors: Kaixiang Zhu, Shenzhen (CN); Xiaomang Dai, Shenzhen (CN); Dong Wu, Shenzhen (CN); Feng Liang, Shenzhen (CN); Jun Fan, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 29 days.

(21) Appl. No.: 18/869,744

(22) PCT Filed: Mar. 3, 2023

(86) PCT No.: PCT/CN2023/079547

§ 371 (c)(1),
(2) Date: Nov. 26, 2024

(87) PCT Pub. No.: WO2024/040913

PCT Pub. Date: Feb. 29, 2024

(65) Prior Publication Data

US 2025/0338003 A1 Oct. 30, 2025

(30) Foreign Application Priority Data

Aug. 25, 2022 (CN) ......................... 202222246568.4

(51) Int. Cl.
*H04N 23/57* (2023.01)

(52) U.S. Cl.
CPC .................................. *H04N 23/57* (2023.01)

(58) Field of Classification Search
CPC ........ H04N 23/57; H04N 23/52; H04N 23/55; H04N 23/50; H04M 1/026; H04M 1/0277;

(Continued)

(56) References Cited

U.S. PATENT DOCUMENTS 10,530,043 B2 1/2020 Liu et al.
2009/0021635 A1 1/2009 Cheng (Continued)

FOREIGN PATENT DOCUMENTS

CN 203965703 U 11/2014
CN 107453032 A 12/2017

(Continued)

*Primary Examiner* — Abdelaaziz Tissire
(74) *Attorney, Agent, or Firm* — WOMBLE BOND DICKINSON (US) LLP

(57) ABSTRACT

This application relates to the technical field of electronic devices, and provides a camera module and an electronic device, to resolve problems that a camera module is easily disturbed, shooting performance of the electronic device is reduced, and a shooting effect is affected. The foregoing camera module is applied to the electronic device, which includes a lens, a camera circuit board, and a ground member. The camera circuit board is fixed to the lens. The ground member is arranged on the camera circuit board and electrically connected to the camera circuit board. The ground member is electrically connected to a ground terminal of a circuit board of the electronic device.

18 Claims, 7 Drawing Sheets

(58) Field of Classification Search
CPC ... H04M 1/0264; H01Q 1/243; H05K 1/0215; H05K 1/144; H05K 2201/10121; H05K 2201/10371; H05K 1/0216; H05K 1/141
See application file for complete search history.

(56) References Cited

U.S. PATENT DOCUMENTS

| | | | | |
|---|---|---|---|---|
| 2015/0281528 | A1* | 10/2015 | Li | H04N 23/51 348/357 |
| 2021/0006144 | A1* | 1/2021 | Chen | H02K 11/40 |
| 2022/0418082 | A1* | 12/2022 | Son | H05K 1/0216 |

FOREIGN PATENT DOCUMENTS

| | | | |
|---|---|---|---|
| CN | 209691992 | U | 11/2019 |
| CN | 111565276 | A | 8/2020 |
| CN | 212086313 | U | 12/2020 |
| CN | 112602309 | A | 4/2021 |
| CN | 112736461 | A | 4/2021 |
| CN | 213367941 | U | 6/2021 |
| CN | 214177394 | U | 9/2021 |
| CN | 219164662 | U | 6/2023 |
| KR | 20070013786 | A | 1/2007 |
| WO | 2020047754 | A1 | 3/2020 |

* cited by examiner

CAMERA MODULE AND ELECTRONIC DEVICE

CROSS-REFERENCE TO RELATED APPLICATIONS

This application is a National Stage of International Application No. PCT/CN2023/079547, filed on Mar. 3, 2023, which claims priority to Chinese Patent Application No. 202222246568.4, filed on Aug. 25, 2022, both of which are hereby incorporated by reference in their entireties.

TECHNICAL FIELD

This application relates to the technical field of electronic devices, and in particular, to a camera module and an electronic device.

BACKGROUND

Most existing electronic devices have a photographing function. In addition, users have increasingly high requirements for shooting effects of the electronic devices. However, an antenna needs to be arranged inside the electronic device, and when the antenna transmits a signal, phenomena such as blurred screen and stuttering may be caused during shooting. Therefore, shooting performance of the electronic device is reduced, and user experience is affected.

SUMMARY

Embodiments of this application provide a camera module and an electronic device, to resolve a problem that a shooting effect is affected as a result of an existing camera module being easily disturbed and shooting performance of the electronic device being reduced.

To achieve the foregoing objective, the following technical solutions are used in embodiments of this application.

According to a first aspect, a camera module is provided. The camera module is applied to the electronic device, including a lens, a camera circuit board, and a ground member. The camera circuit board is fixed to the lens. The ground member is arranged on the camera circuit board and electrically connected to the camera circuit board. The ground member is electrically connected to a ground terminal of a circuit board of the electronic device.

Based on the camera module provided in the first aspect of this application, the ground member is arranged on the camera circuit board, the ground member is electrically connected to the camera circuit board, and the ground member is electrically connected to the ground terminal of the circuit board of the electronic device. A ground point between the camera circuit board and the circuit board of the electronic device is added, which helps improve an interference suppression effect of the camera module and helps improve a shooting effect of the camera module.

In some embodiments of this application, the camera module further includes a connection structure. A first end of the connection structure is electrically connected to the camera circuit board, and a second end of the connection structure is electrically connected to the circuit board of the electronic device. A distribution direction of the connection structure and the camera circuit board is a first direction, and two edges distributed on the camera circuit board along a direction perpendicular to the first direction are first edges. The ground member extends out of the camera circuit board from each of the first edges, and is electrically connected to the ground terminal of the circuit board of the electronic device. In this way, the ground member is electrically connected to the ground terminal of the electronic device at the first edge. The ground point between the camera circuit board and the circuit board of the electronic device is added along the first direction, to change a resonance frequency of the camera module along the first direction, so that the resonance frequency of the camera module deviates from a sensitive band of the antenna of the electronic device, thereby preventing the antenna of the electronic device from being strongly coupled to the camera module when the antenna transmits a signal, and then avoiding interference with the camera module, to improve the shooting effect of the camera module and help improve user experience.

In some embodiments of this application, a conductive region is formed on a surface of the camera circuit board away from the lens. The ground member is attached to the conductive region and is electrically connected to the camera circuit board. The ground member extends out of the camera circuit board from the first edge, and is electrically connected to the ground terminal of the circuit board of the electronic device. In this way, a part of the ground member that extends from the first edge is electrically connected to the ground terminal of the circuit board of the electronic device, so that the resonance frequency of the camera module along the first direction may be changed. Therefore, the resonance frequency of the camera module in the first direction can deviate from the sensitive band of the antenna of the electronic device, so that the camera module can be prevented from being disturbed, which helps improve the shooting effect of the camera module.

In some embodiments of this application, the conductive region includes a ground layer of the camera circuit board.

In some embodiments of this application, two ends of the ground member extend out of the camera circuit board respectively from the two first edges, and are electrically connected to the ground terminal of the circuit board of the electronic device. In this way, the ground point is formed at the two first edges arranged on the camera circuit board along the first direction, which helps further change the resonance frequency of the camera module along the first direction, to prevent the camera module from being strongly coupled to an antenna signal of the electronic device.

In some embodiments of this application, the ground member includes a conductive fabric or a copper sheet. The conductive fabric or the copper sheet is used as the ground member. The ground member only needs to be mounted to the camera circuit board, so that the ground member can be electrically connected to the camera circuit board. The mounting is easier and more convenient.

In some embodiments of this application, the ground member extends out of the camera circuit board along a direction away from the camera circuit board from the first edge, and is in contact with and electrically connected to an adjacent shielding cover. The shielding cover is electrically connected to the ground terminal of the circuit board of the electronic device. The shielding cover is in good contact with the ground terminal of the circuit board of the electronic device. Therefore, the ground member is electrically connected to the shielding cover, so that the ground member can be electrically connected to the ground terminal of the circuit board.

In some embodiments of this application, the two ends of the ground member respectively extend in opposite directions from the two first edges, and extend out of the camera circuit board. An end of the ground member is in contact with and electrically connected to the adjacent shielding cover. The shielding cover is electrically connected to the ground terminal of the circuit board of the electronic device. An other end of the ground member is in contact with and electrically connected to the ground layer of the circuit board of the electronic device. In this way, the ground point may be arranged at both the first edges of the camera circuit board along the first direction, thereby further ensuring that the camera module and the antenna signal are not strongly coupled.

In some embodiments of this application, the ground member includes a metal support and a conductive layer. The metal support is arranged on a side of the camera circuit board away from the lens. The conductive layer is arranged between the metal support and the camera circuit board. The metal support is electrically connected to the camera circuit board through the conductive layer. The metal support is electrically connected to the ground terminal of the circuit board of the electronic device. In the structure, the metal support and the conductive layer are used to form the ground member. The conductive layer is attached to the camera circuit board and in contact with the conductive region, so that the conductive layer may be electrically connected to the camera circuit board. In addition, the metal support is in contact with and electrically connected to the conductive layer, so that the metal support can be electrically connected to the camera circuit board. Then the metal support is electrically connected to the ground terminal of the circuit board of the electronic device, so that the ground point between the camera module and the circuit board may be added.

In some embodiments of this application, the metal support includes a support body, a first connecting end, and a fastener. The support body is attached to the conductive layer. The first connecting end is fixedly connected to the support body, and the first connecting end extends out of the camera circuit board from each of the first edges. The first connecting end and the circuit board of the electronic device are fixedly connected through the fastener. The first connecting end is electrically connected to the ground terminal of the circuit board of the electronic device through the fastener. In this way, on the one hand, relative fixation between the metal support and the circuit board of the electronic device can be implemented through the fastener. On the other hand, an electrical connection between the metal support and the circuit board of the electronic device is implemented through the fastener. In other words, the fastener is used as the connection structure for implementing the electrical connection between the ground terminal of the circuit board of the electronic device and the first connecting end of the metal support, which helps reduce components and cause an overall structure to be more compact.

In some embodiments of this application, the fastener is a screw.

In some embodiments of this application, the metal support further includes a second connecting end and a metal elastic piece. The second connecting end is fixedly connected to the support body. A connection line between the second connecting end and the first connecting end intersects a straight line where the first direction is located. An end of the metal elastic piece abuts against the second connecting end, and an other end of the metal elastic piece is electrically connected to the ground terminal of the circuit board of the electronic device. In other words, the second connecting end and the first connecting end respectively extend out of the camera circuit board from the two first edges, so that the camera circuit board is provided with the ground point at each of the first edges along the first direction. In addition, the fastener causes the metal support to be fixed relative to the circuit board of the electronic device. Therefore, no additional fixing structure is required between the second connecting end and the circuit board, and the metal elastic piece abuts between the second connecting end and the ground terminal of the circuit board, so that the second connecting end may be electrically connected to the ground terminal of the circuit board.

In some embodiments of this application, a shielding cover is arranged between the metal elastic piece and the circuit board of the electronic device. The shielding cover is electrically connected to the ground terminal of the circuit board of the electronic device, and the metal elastic piece is electrically connected to the shielding cover.

In some embodiments of this application, a matching member is connected in series between the metal elastic piece and the ground terminal of the circuit board of the electronic device. The matching member is configured to adjust the resonance frequency of the camera module. In this way, the resonance frequency of the camera module can be adjusted by adjusting a numerical value of the matching member, thereby ensuring that the camera module and the antenna signal of the electronic device are not strongly coupled, which helps improve the shooting effect of the camera module.

In some embodiments of this application, the conductive layer includes conductive foam.

In some embodiments of this application, the conductive layer includes a high dielectric material or a wave-absorbing material.

In some embodiments of this application, the camera module further includes a matching member. The matching member is connected in series between the ground member and the ground terminal of the circuit board of the electronic device. The matching member is configured to adjust the resonance frequency of the camera module. In the structure, the matching member with different numerical values is arranged, so that the resonance frequency of the camera module may be adjusted, to ensure that the camera module is not strongly coupled to the antenna signal.

In some embodiments of this application, the matching member includes a capacitor or an inductor.

In some embodiments of this application, the matching member includes a capacitor and an inductor. The capacitor and the inductor are connected in parallel with each other, and the capacitor and the inductor connected in parallel with each other are connected in series between the ground member and the ground terminal of the circuit board of the electronic device.

In some embodiments of this application, the camera module further includes a front camera module.

According to a second aspect, an electronic device is provided, including a housing, a circuit board, and a camera module. The circuit board is arranged inside the housing. The camera module is the camera module as described in any one of the technical solutions. The camera module is arranged inside the housing, and a second end of an FPC board of the camera module is electrically connected to the circuit board. In addition, the ground member of the camera module is electrically connected to the ground terminal of the circuit board.

The electronic device provided in the second aspect of this application includes the camera module as described in any one of the technical solutions. Therefore, the same technical problem can be resolved, and the same technical result can be achieved.

In some embodiments of this application, the camera module includes a camera circuit board and a connection structure. An end of the connection structure is electrically connected to the camera circuit board, and an other end of the connection structure is electrically connected to the circuit board of the electronic device. Physical dimensions of the camera circuit board and the connection structure along a distribution direction are approximately a quarter wavelength of an operating band of an antenna of the electronic device.

Figure 1:
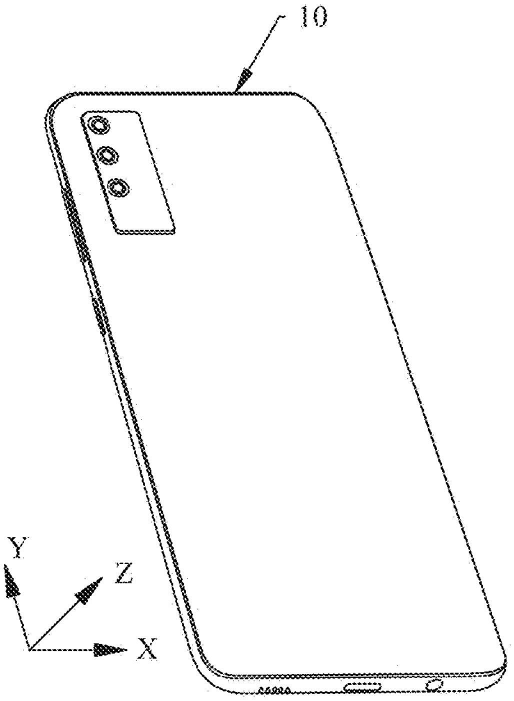
FIG. 1 is a structural diagram of an electronic device according to an embodiment of this application.

Reference numerals: 10—Electronic device; 100—Display module; 110—Light-transmissive cover plate; 120—Display; 200—Housing; 210—Rear cover; 211—Rear cover body; 211*a*—Mounting notch; 212—Lens decoration member; 212*a*—Light-transmissive window; 220—Frame; 230—Middle plate; 231—Light-transmissive hole; 300—Circuit board; 400—Circuit board support; 500—Camera module; 510—Lens; 520—FPC board; 530—Camera circuit board; 531—First edge; 532—First surface; 540—Ground member; 541—Metal support; 541*a*—Support body; 541*b*—First connecting end; 541*c*—Second connecting end; 541*d*—Fastener; 541*e*—Metal elastic piece; 542—Conductive layer; 543—Matching member; 600—Shielding cover.

DESCRIPTION OF EMBODIMENTS

Technical solutions in embodiments of this application are described below with reference to accompanying drawings in embodiments of this application. Apparently, the described embodiments are merely some rather than all embodiments of this application.

Following terms "first" and "second" are merely used for description, and cannot be construed as indicating or implying relative importance or implicitly indicating a quantity of indicated technical features. Therefore, a feature defined by "first" or "second" may explicitly or implicitly include one or more features.

In addition, in this application, orientation terms such as "upper" and "lower" are defined relative to orientations for schematic placement of components in the accompanying drawings. It should be understood that these directional terms are relative concepts, which are used for description and clarification relative to each other, and may change accordingly depending on changes in the orientations where the components are placed in the accompanying drawings.

In this application, unless otherwise explicitly specified and defined, the term "connection" should be understood in a broad sense. For example, the "connection" may be a fixed connection, a detachable connection, or an integral connection. The connection may be a direct connection, or an indirect connection through an intermediary.

Embodiments of this application provide an electronic device. The electronic device is an electronic device with a shooting function. Specifically, the electronic device may be a portable electronic device or another type of electronic device. For example, the electronic device may be a mobile phone, a tablet personal computer, a laptop computer, a personal digital assistant (PDA), a monitor, a camera, a personal computer, a notebook computer, an on-board device, a wearable device, augmented reality (AR) glasses, an AR helmet, virtual reality (VR) glasses, or a VR helmet. For ease of description below, a description is provided by using an example in which the electronic device is the mobile phone.

It may be learned from above that referring to FIG. 1, FIG. 1 is a structural diagram of an electronic device 10 according to an embodiment of this application. In this embodiment, the electronic device 10 is a mobile phone, and the electronic device 10 may be approximately in a shape of a rectangular plate. Based on this, to facilitate the description of following embodiments, an XYZ coordinate system is established. A width direction of the electronic device 10 is defined as an X-axis direction, a length direction of the electronic device 10 is defined as a Y-axis direction, and a thickness direction of the electronic device 10 is defined as a Z-axis direction. It may be understood that the coordinate system of the electronic device 10 may be flexibly set based on an actual requirement. Only one example is provided in this application, which cannot be considered as a special limitation on this application.

Figure 2:
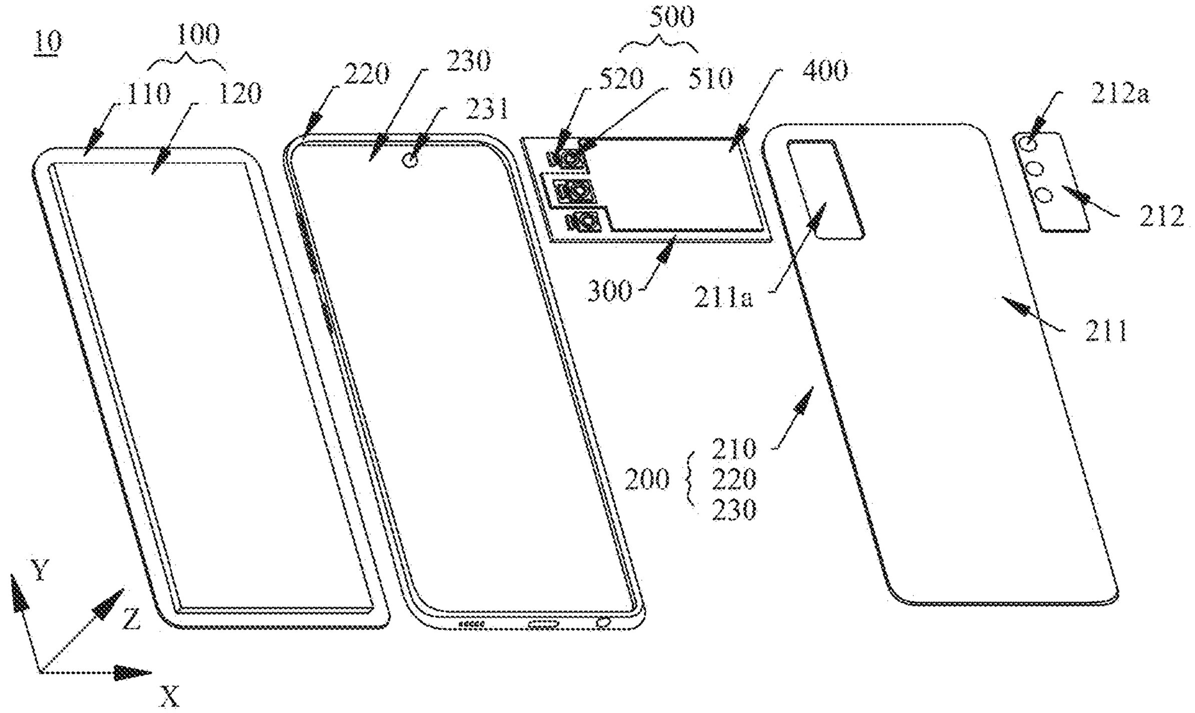
FIG. 2 is an exploded view of an electronic device according to an embodiment of this application.

In this embodiment, referring to FIG. 2, FIG. 2 is an exploded view of an electronic device 10 according to an embodiment of this application. The foregoing electronic device 10 may include a display module 100, a housing 200, a circuit board 300, a circuit board support 400, and a camera module 500.

The foregoing display module 100 is configured to display an image, a video, and the like. The display module 100 may include a light-transmissive cover plate 110 and a display 120. The light-transmissive cover plate 110 and the display 120 are stacked. the light-transmissive cover plate 110 may be an ordinary light-transmissive cover plate 110, which is configured to protect the display 120 to avoid damage to the display 120 due to a collision by an external force, and can play a dustproof role. The light-transmissive cover plate 110 with a touch function may also be adopted, so that the electronic device 10 has a touch function, thereby making it more convenient for a user to use. Therefore, a specific material of the light-transmissive cover plate 110 is not specially limited in this application.

In addition, a flexible display or a rigid display may be used as the display 120. For example, the display 120 may be an organic light-emitting diode (OLED) display, an active-matrix organic light-emitting diode (AMOLED) display, a mini light-emitting diode display, a micro light-emitting diode display, a micro organic light-emitting diode display, a quantum dot light-emitting diode (QLED) display, or a liquid crystal display (LCD).

The foregoing housing 200 is configured to protect an electronic device inside the electronic device 10. The housing 200 includes a rear cover 210 and a frame 220. The rear cover 210 is located on a side of the display 120 away from the light-transmissive cover plate 110, and is arranged in a stacked and spaced configuration with the light-transmissive cover plate 110 and the display 120. The frame 220 is located between the light-transmissive cover plate 110 and the rear cover 210. The frame 220 is fixed to the rear cover 210. For example, the frame 220 may be connected to the rear cover 210 by bonding and fixation. The frame 220 and the rear cover 210 may also be integrally formed, that is, the frame 220 and the rear cover 210 are formed as an integral structure. The light-transmissive cover plate 110 may be fixed to the frame 220 through an adhesive, so that the light-transmissive cover plate 110, the rear cover 210, and the frame 220 define an internal accommodating space of the electronic device 10. The foregoing display 120, the circuit board 300, and the camera module 500 are all arranged in the internal accommodating space.

In some embodiments, still referring to FIG. 2, the foregoing housing 200 may further include a middle plate 230. The middle plate 230 is arranged in the internal accommodating space, and the middle plate 230 is located on a side of the display 120 away from the light-transmissive cover plate 110. The middle plate 230 is fixedly connected to the frame 220. For example, the middle plate 230 and the frame 220 may be fixedly connected through the adhesive, and the middle plate 230 and the frame 220 may also be integrally formed, that is, the middle plate and the frame are formed as an integral structure. The middle plate 230 divides the foregoing internal accommodating space into two independent spaces. One space is located between the light-transmissive cover plate 110 and the middle plate 230, and the display 120 is located in the space. The other space is located between the middle plate 230 and the rear cover 210. The circuit board 300, the circuit board support 400, and the camera module 500 are all arranged in the space.

The foregoing circuit board 300 is configured to arrange electronic components and devices of the electronic device 10 and realize electrical connections among the electronic components and devices. For example, the electronic components and devices may be control chips (for example, system on chips, SOCs), graphics processing units (GPUs), universal flash storages (UFSs), receivers, flash modules, and the like.

The foregoing circuit board support 400 is arranged inside the electronic device 10. Specifically, the circuit board support 400 is arranged between the circuit board 300 and the rear cover 210. In some embodiments, the circuit board support 400 is fixed to the middle plate 230, and the circuit board support 400 covers a surface of the circuit board 300 toward the rear cover 210. Some electronic components and devices (such as flash modules) connected by non-fixed structures such as a flexible printed circuit (FPC) and an elastic piece are adopted to protect the circuit board 300 and these electronic components and devices on the circuit board 300, to avoid damage to the electronic device 10 as a result of movement of positions of these electronic components and devices during maintenance of the rear cover 210.

The foregoing camera module 500 is configured to realize shooting of a video or an image. The camera module 500 includes, but is not limited to, a main camera, a wide-angle camera, a telephoto camera, and the like. Structural forms of the camera module 500 include, but are not limited to, an upright structure and a periscopic structure. Still referring to FIG. 2, the camera module 500 may include a lens 510. The lens 510 has a light incidence surface. The light incidence surface may be a light incidence surface of an optical lens 510 inside the lens 510.

The foregoing camera module 500 may include a front camera module and a rear camera module. The front camera module and the rear camera module are both arranged between the middle plate 230 and the rear cover 210. For example, the foregoing rear camera module is fixed to the middle plate 230, and a light incidence surface of the lens 510 in the rear camera module faces the rear cover 210. In some embodiments, the rear cover 210 may include a rear cover body 211 and a lens decoration member 212. A mounting notch 211*a* may be provided on the rear cover body 211. The lens decoration member 212 is fixed to the mounting notch 211*a*. A light-transmissive window 212*a* is arranged on the lens decoration member 212. The light incidence surface of the lens 510 of the rear camera module is opposite to the light-transmissive window 212*a*, so that an external light ray can pass through the light-transmissive window 212*a* and enter a body of the lens 510, to realize shooting of the video or the image by the rear camera module of the electronic device 10.

A light-transmissive hole 231 is provided on the foregoing middle plate 230. The front camera module is fixed to the middle plate 230. The light incidence surface of the lens 510 in the front camera module is opposite to the light-transmissive hole 231, so that the light ray can pass through the display module 100 and then through the light-transmissive hole 231 and enter the body of the lens 510 in the front camera module, to realize the shooting of the video or the image by the front camera module of the electronic device 10.

Figure 3:
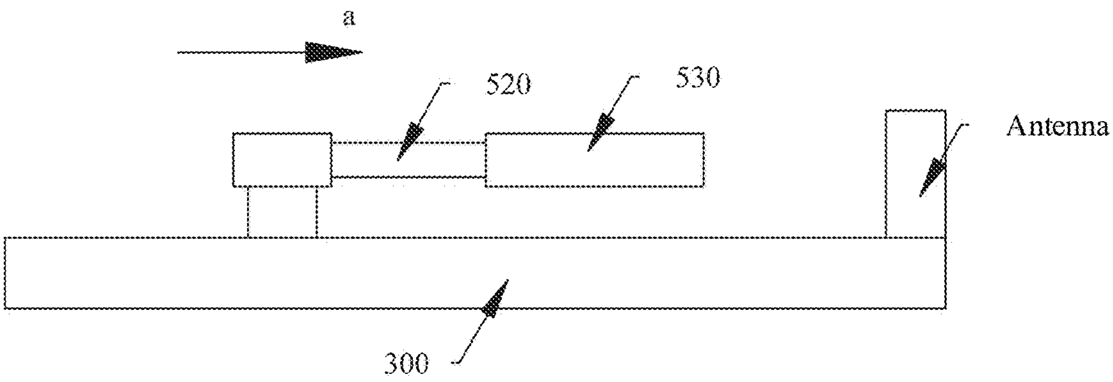
FIG. 3 is a diagram showing a connection structure between a camera module and a circuit board according to the related art.

In addition, refer to FIG. 3. FIG. 3 is a structural diagram of a camera module 500 according to the related art. The camera module 500 further includes a camera circuit board 530 and a connection structure. For example, the connection structure may include an FPC board 520. The camera circuit board 530 is fixedly connected to a lens 510 (not shown in FIG. 3). An end of the FPC board 520 is electrically connected to the camera circuit board 530, and an other end of the FPC board 520 is electrically connected to the foregoing circuit board 300. For example, the FPC board 520 and the circuit board 300 may be electrically connected through board-to-board connectors (BTB connectors).

Figure 4:
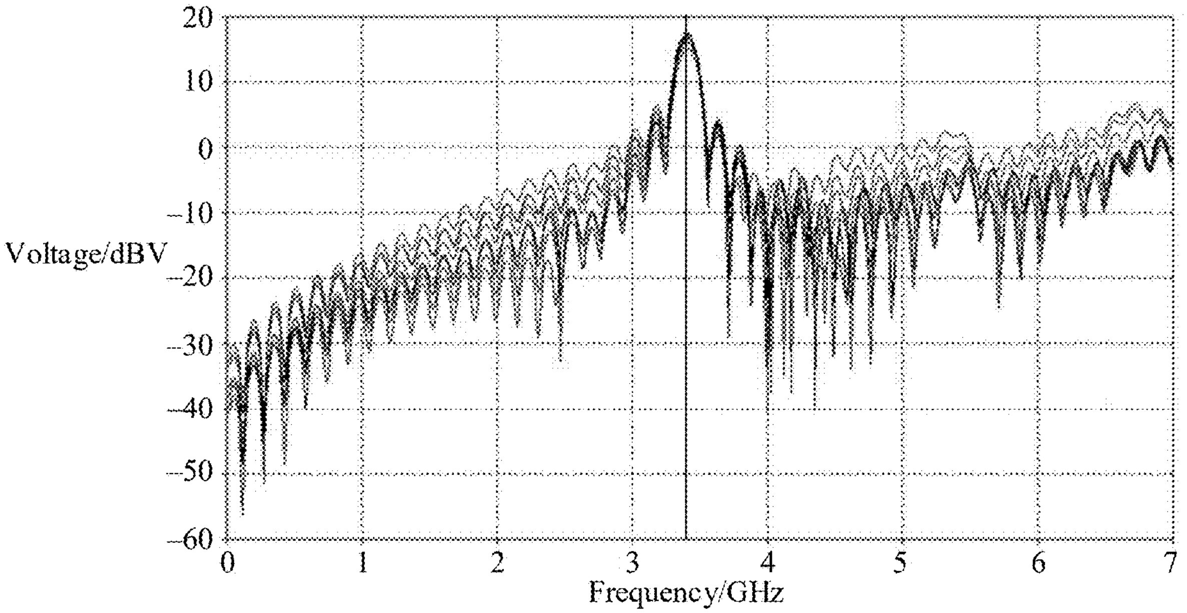
FIG. 4 is a resonance characteristic diagram of a camera module according to FIG. 3.

During shooting of a video or an image by the camera module 500, a radio frequency antenna of an electronic device 10 causes interference to the camera module 500, resulting in phenomena such as a blurred screen, stuttering, a freezing screen, a crash, and harmonic excitation. For example, an N78 band is currently a main band for a 5G network. However, physical dimensions of a front camera module of an existing electronic device 10 along a distribution direction (the direction is a first direction, which is a direction shown by a solid line arrow a in FIG. 3) of the camera circuit board 530 and the FPC board 520 are approximately a quarter wavelength of the N78 band. Therefore, refer to FIG. 4. FIG. 4 is a resonance characteristic diagram of a camera module 500 according to FIG. 3. When a frequency of an interference signal is approximately 3.4G, the camera module 500 generates a relatively high voltage, that is, a maximum peak shown in FIG. 4. In addition, the resonance frequency is in the N78 band. Therefore, the electronic device 10 is prone to strong coupling with the front camera module in the first direction during transmission of a signal, causing the front camera module to be disturbed and a shooting effect to be affected.

Figure 5:
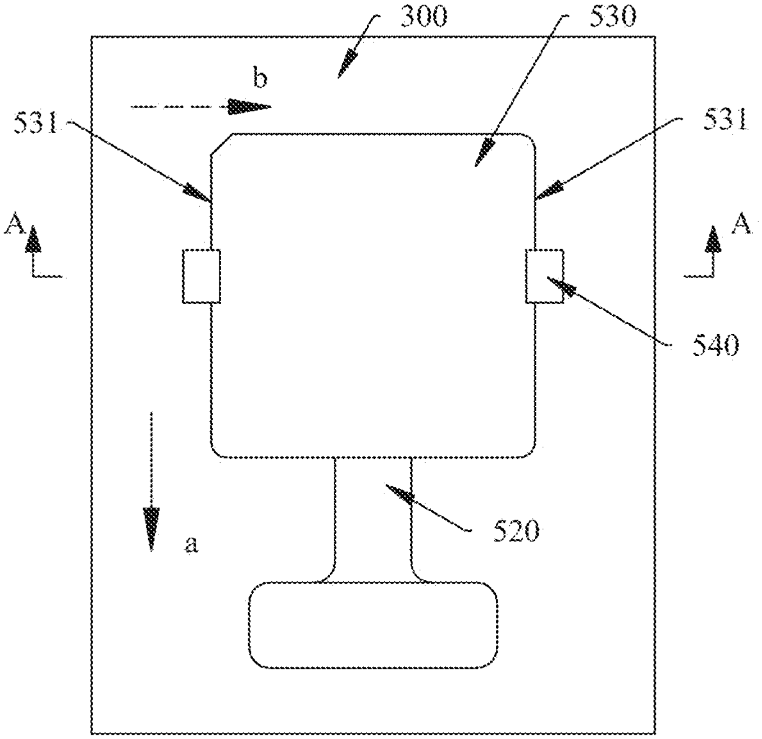
FIG. 5 is a structural diagram of a camera module according to an embodiment of this application.
Figure 6:
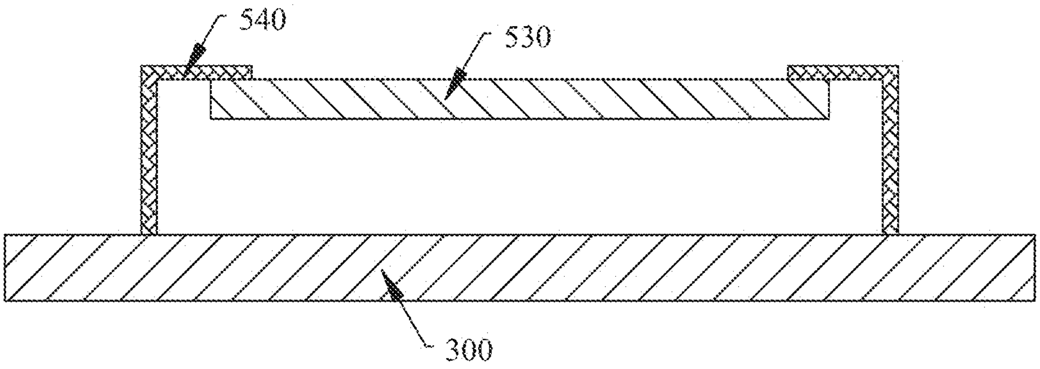
FIG. 6 is a cross-sectional view taken along line A-A in FIG. 5.
Figure 7:
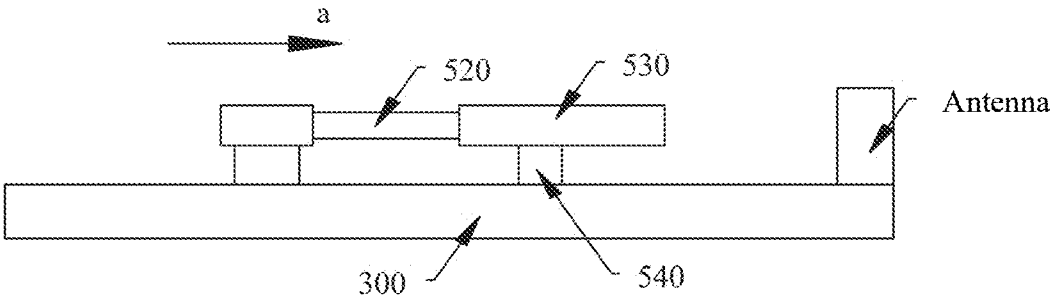
FIG. 7 is a diagram showing a connection structure between a camera module and a circuit board according to FIG. 5.

Based on this, to resolve the problem, refer to FIG. 5, FIG. 6, and FIG. 7. FIG. 5 is a structural diagram of a camera module 500 according to an embodiment of this application. FIG. 6 is a cross-sectional view taken along line A-A in FIG. 5. FIG. 7 is a diagram showing a connection structure between a camera module 500 and a circuit board 300 according to FIG. 5. The camera module 500 may be applied to the foregoing electronic device 10. In addition, the camera module 500 may serve as a front camera module, or may serve as a rear camera module. This is not specially limited in this application. A description is provided by using am example in which the camera module 500 is the front camera module.

Specifically, the camera module 500 provided in embodiments of this application not only includes the foregoing lens 510 (not shown in FIG. 5 and FIG. 7), a camera circuit board 530, and an FPC board 520, but also includes a ground member 540. The camera circuit board 530 has two first edges 531 arranged opposite each other. A distribution direction of the two first edges 531 is a second direction (as shown by a dashed arrow b in FIG. 5). The second direction is perpendicular to the foregoing first direction. The ground member 540 is arranged on the camera circuit board 530 and is electrically connected to the camera circuit board 530. The ground member 540 extends out of the camera circuit board 530 from each of the first edges 531, and is electrically connected to a ground terminal of the circuit board 300.

Figure 8:
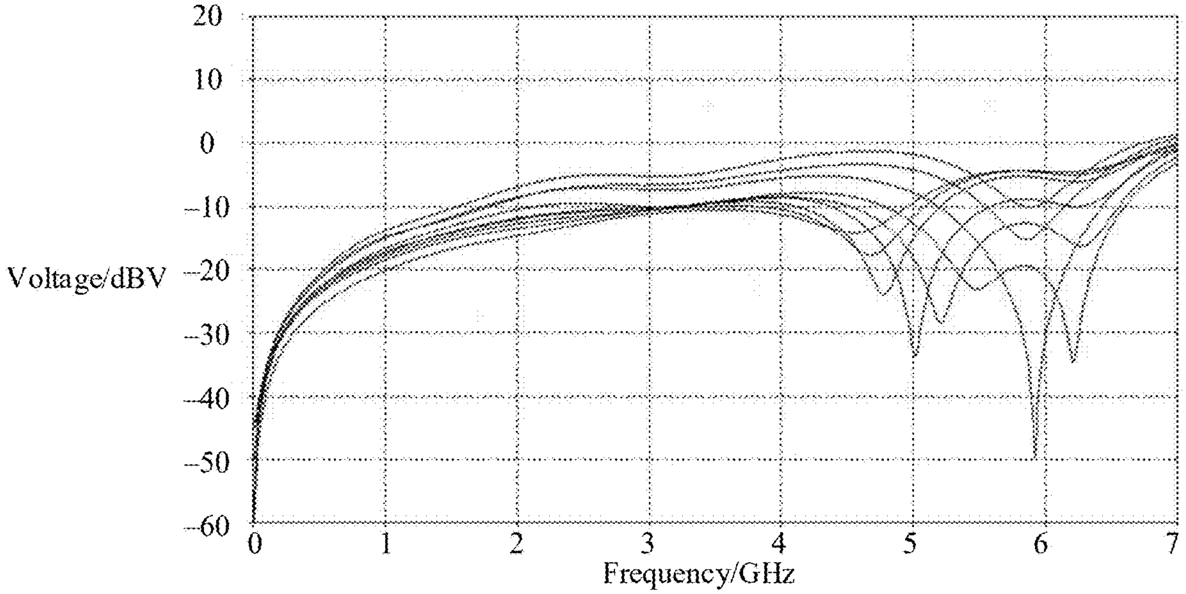
FIG. 8 is a resonance characteristic diagram of a camera module according to FIG. 5.

In this case, refer to FIG. 8. FIG. 8 is a resonance characteristic diagram of a camera module 500 according to FIG. 5. A ground point is added at a first edge 531 of the camera circuit board 530, so that a resonance point of the camera circuit board 530 along a first direction can be changed. As shown in FIG. 8, the camera module 500 does not generate a relatively high voltage when a frequency is approximately 3.4G, so that the resonance point of the camera module 500 deviates from a sensitive band (for example, an N78 band) of an electronic device 10, thereby preventing the camera module 500 from being disturbed as a result of the antenna being strongly coupled to the camera module 500 when an antenna of the electronic device 10 transmits power, which helps improve a shooting effect of the camera module 500.

It should be noted that, the foregoing second direction being perpendicular to the first direction means that the second direction is substantially perpendicular to the first direction. In other words, the second direction may also be offset from the first direction by a specific angle, for example, within a range of plus or minus 5°. In addition, both the first direction and the second direction may be any direction parallel to an XY plane. This is not specially limited in this application. In the following embodiments, a description is provided by using an example in which the first direction is parallel to a Y-axis direction and the second direction is parallel to an X-axis direction.

In addition, a surface of the camera circuit board 530 away from the lens 510 is a first surface 532. A conductive region (for example, a copper leakage region, that is, a ground layer of the camera circuit board 530) is arranged on the first surface 532.

Figure 9:
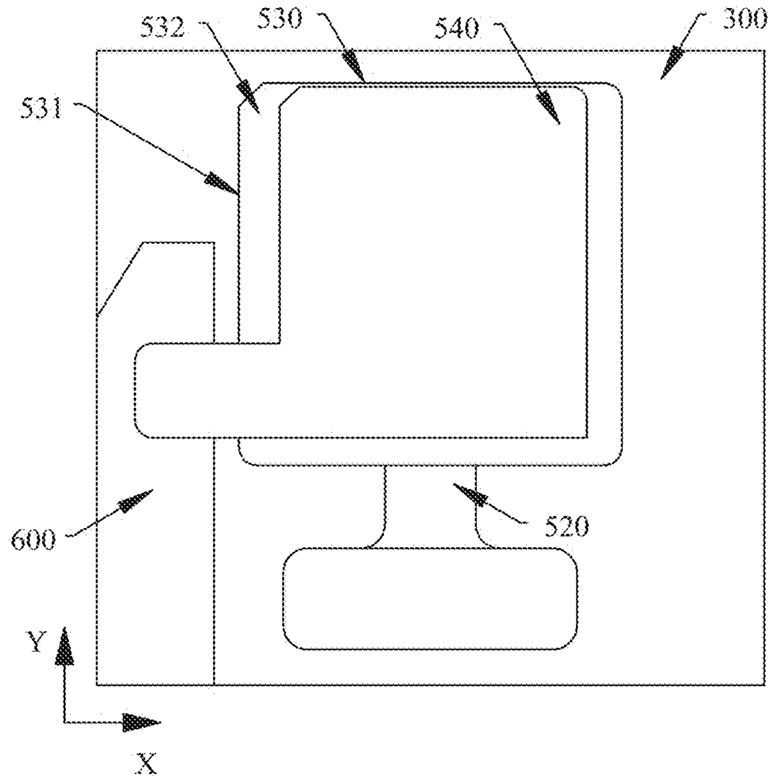
FIG. 9 is a structural diagram of a ground member of a camera module according to an embodiment of this application.

In some embodiments, refer to FIG. 9. FIG. 9 is a structural diagram of a ground member 540 of a camera module 500 according to an embodiment of this application. The foregoing ground member 540 may include a conductive fabric or a copper sheet. The ground member 540 is attached to a first surface 532 of a camera circuit board 530, and is in contact with and electrically connected to a conductive region on a first surface 532, to implement an electrical connection between the ground member 540 and the camera circuit board 530. In addition, the ground member 540 extends out of the camera circuit board 530 from a first edge 531 of the camera circuit board 530, and is in contact with and electrically connected to an adjacent shielding cover 600. The shielding cover 600 is in good contact with the ground terminal of the circuit board 300. Therefore, the ground member 540 is in contact with the shielding cover 600, so that the ground member 540 may be electrically connected to the ground terminal of the circuit board 300, thereby implementing an electrical connection between the camera circuit board 530 and the ground terminal of the circuit board 300.

It may be understood that the foregoing ground member 540 extending out of the camera circuit board 530 from the first edge 531 of the camera circuit board 530 means that a vertical projection of the ground member 540 (that is, the conductive fabric or the copper sheet) in the XY plane extending beyond a range covered by the vertical projection of the camera circuit board 530 from the first edge 531. In other words, a vertical projection of a part of the ground member 540 extending out of the camera circuit board 530 does not overlap with the vertical projection of the camera circuit board 530.

Figure 10:
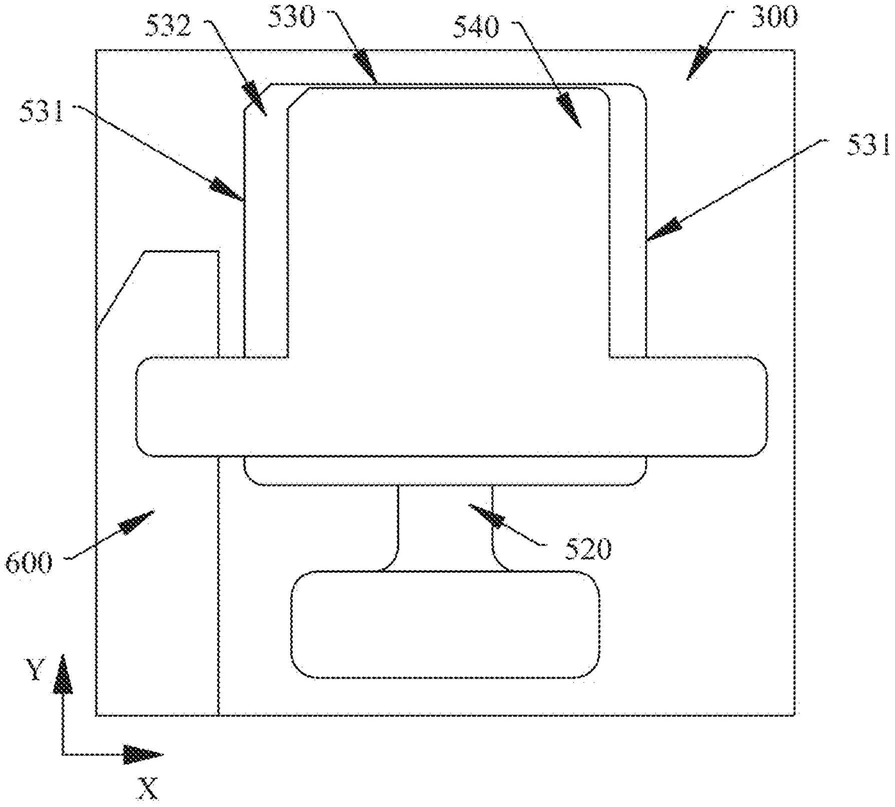
FIG. 10 is a structural diagram of another ground member of a camera module according to an embodiment of this application.

In addition, to further ensure a shooting effect of the camera module 500, refer to FIG. 10. FIG. 10 is a structural diagram of another ground member 540 of a camera module 500 according to an embodiment of this application. Two ends of the ground member 540 along the foregoing second direction (an X-axis direction) extend out of a camera circuit board 530 from two first edges 531. In addition, an end of the ground member 540 may be attached to and in contact with the shielding cover 600, and an other end of the ground member 540 may be in contact with and electrically connected to a ground layer of a circuit board 300. In this way, a ground point is arranged on each of the two first edges 531 arranged along a first direction on the camera circuit board 530, to implement a better interference suppression effect, which helps further improve the shooting effect of the camera module 500.

Table 1 below shows simulation test results of the camera module 500 provided with the foregoing ground member 540 (the conductive fabric or the copper sheet) and the camera module 500 not provided with the ground member 540.

TABLE 1

| MIPI | State | OA | 0B | 0C | 1A | 1B | 1C | 2A | 2B | 2C | Worst case | Mean value | Improvement |
|---|---|---|---|---|---|---|---|---|---|---|---|---|---|
| Simulation | Initial | −36.7 | −37.7 | −37.1 | −37.8 | −39 | −38.1 | −36.9 | −38 | −39.2 | −36.7 | −37.8 | |
| isolation | Improvement | −48.8 | −49.3 | −49.1 | −50.7 | −51.2 | −50.7 | −50 | −51.5 | −51 | −48.8 | −50.3 | 12.1 |

It may be learned from the foregoing Table 1 that the isolation of the camera module 500 can be improved by arranging the ground member 540 on the camera module 500, that is, mounting a conductive portion or the copper sheet on the camera circuit board 530, and electrically connecting the conductive portion or the copper sheet to the ground terminal of the circuit board 300, thereby helping improve an interference suppression effect of the camera module 500.

Figure 11:
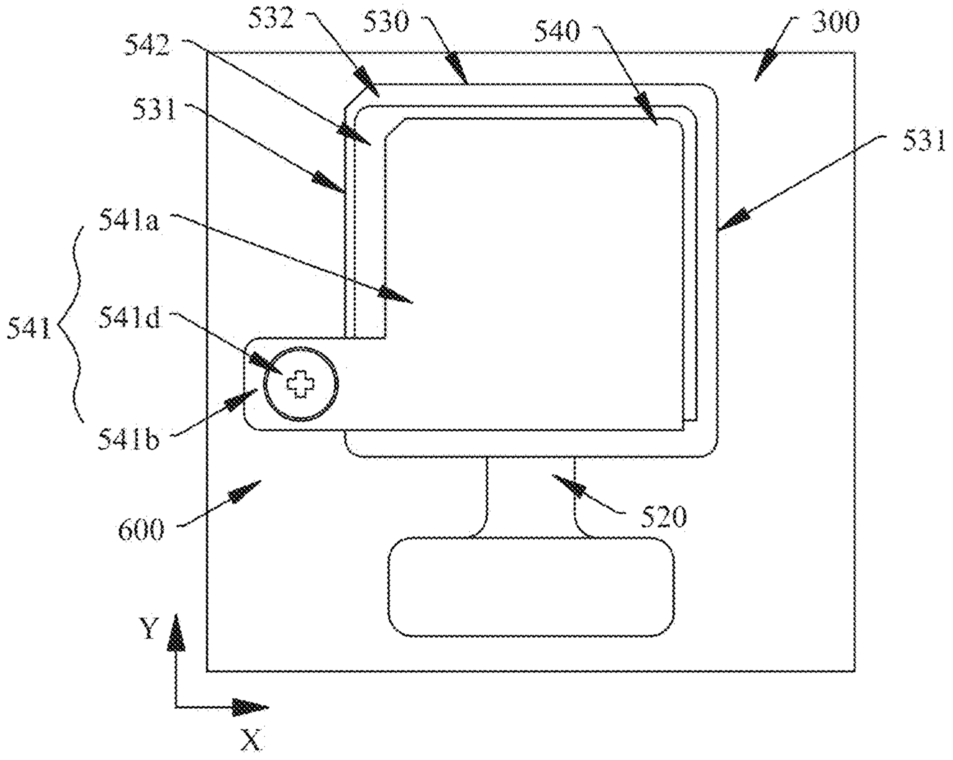
FIG. 11 is a structural diagram of still another ground member of a camera module according to an embodiment of this application.

In some other embodiments, referring to FIG. 11, FIG. 11 is a structural diagram of still another ground member 540 of a camera module 500 according to an embodiment of this application. The foregoing ground member 540 may further include a metal support 541 and a conductive layer 542. The conductive layer 542 is attached to a first surface 532, and is in contact with and electrically connected to a conductive region of a camera circuit board 530. The metal support 541 is arranged on a side of the conductive layer 542 away from the camera circuit board 530, and is attached to and electrically connected to the conductive layer 542. In other words, the conductive layer 542 is arranged between the metal support 541 and the first surface 532 of the camera circuit board 530, and the metal support and the first surface are electrically connected through the conductive layer 542. The metal support 541 extends from a first edge 531 of the camera circuit board 530, and is electrically connected to the ground terminal of a circuit board 300, to form a ground point on the camera circuit board 530 along the first direction.

Specifically, still refer to FIG. 11. The foregoing metal support 541 may include a support body 541*a*, a first connecting end 541*b*, and a fastener 541*d*. The first connecting end 541*b* is fixedly connected to the support body 541*a*. The first connecting end 541*b* extends out of the camera circuit board 530 from the first edge 531 of the camera circuit board 530. The first connecting end 541*b* is fixedly connected to the circuit board 300 through the fastener 541*d* (for example, a screw), and the first connecting end 541*b* is electrically connected to the ground terminal of the circuit board 300 through the fastener 541*d*. In this way, on the one hand, the support body 541*a* can be fixedly connected to the circuit board 300 through the fastener 541*d*. On the other hand, when the fastener 541*d* is connected to the circuit board 300, the first connecting end 541*b* can be electrically connected to the ground terminal of the circuit board 300 through the fastener 541*d* if only the fastener contacts the ground layer of the circuit board 300, thereby achieving an electrical connection between the metal support 541 and the ground terminal of the circuit board 300.

Figure 12:
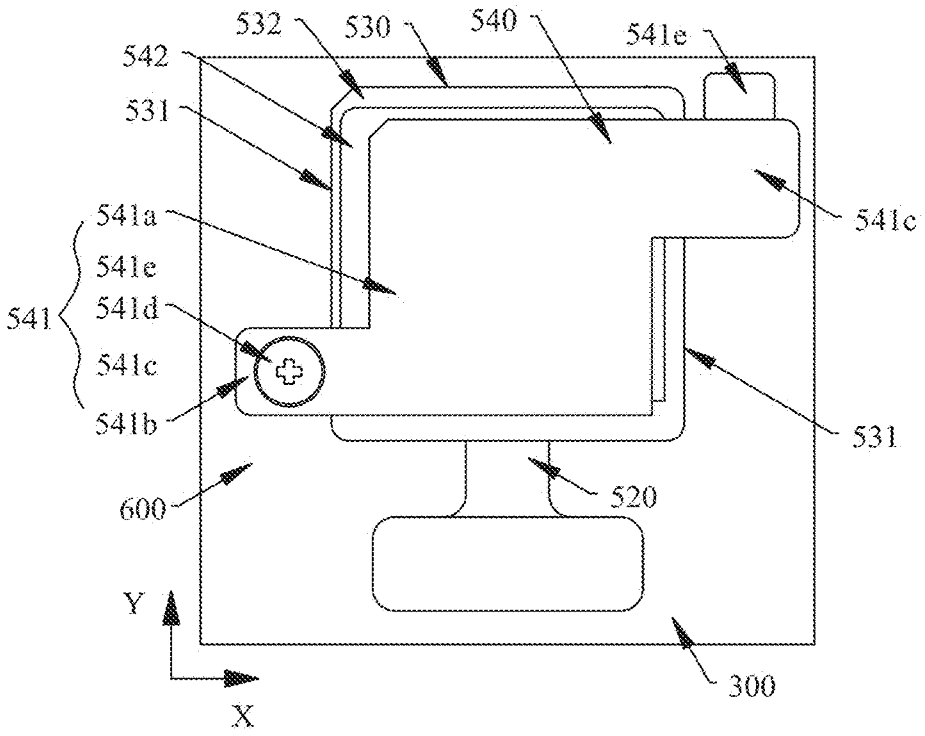
FIG. 12 is a structural diagram of still another ground member of a camera module according to an embodiment of this application.

In addition, refer to FIG. 12. FIG. 12 is a structural diagram of still another ground member 540 of a camera module 500 according to an embodiment of this application. The foregoing metal support 541 may further include a second connecting end 541*c* and a metal elastic piece 541*e*. The second connecting end 541*c* is fixedly connected to the support body 541*a*, and the second connecting end 541*c* and the first connecting end 541*b* are distributed along the foregoing second direction. In other words, the second connecting end 541*c* and the first connecting end 541*b* extend out of the camera circuit board 530 from two first edges 531 of the camera circuit board 530. The metal elastic piece 541*e* abuts between the ground terminal of the circuit board 300 and the second connecting end 541*c*. The first connecting end 541*b* of the metal support 541 is fixedly connected to the circuit board 300 through the fastener 541*d*. In other words, the second connecting end 541*c* of the metal support 541 is also fixed relative to the circuit board 300. Therefore, the second connecting end 541*c* can be electrically connected to the ground terminal of the circuit board 300 by abutting the metal elastic piece 541*e* between the second connecting end 541*c* and the ground terminal of the circuit board 300.

In addition, to further improve connection strength of the metal elastic piece 541*e*, the metal elastic piece 541*e* and the second connecting end 541*c* may be fixedly connected by welding, and an other end of the metal elastic piece 541*e* may also be electrically connected to the ground terminal of the circuit board 300 by welding, thereby avoiding a case of a connection interruption as a result of the metal elastic piece 541*e* being separated from the second connecting end 541*c* or from the ground terminal of the circuit board 300.

It should be noted that, the foregoing first connecting end 541*b* may be fixedly connected to the support body 541*a* by welding, or the like, and the second connecting end 541*c* may be fixedly connected to the support body 541*a* by welding, or the like. An integrally formed structure may also be designed. In other words, the first connecting end 541*b*, the support body 541*a*, and the second connecting end 541*c* are connected as a whole. Therefore, this is not specially limited in this application.

In addition, the first connecting end 541*b* and the second connecting end 541*c* extending out of the camera circuit board 530 from the first edge 531 means that vertical projections of the first connecting end 541*b* and the second connecting end 541*c* in an XY plane do not overlap with a vertical projection of the camera circuit board 530 in the XY plane, and that the first connecting end 541*b* and the second connecting end 541*c* are respectively located on two sides of the camera circuit board 530 along the foregoing second direction.

Moreover, the first connecting end 541*b* and the second connecting end 541*c* being distributed along the second direction means that the first connecting end and the second connecting end may be on a same straight line along the second direction, or may be staggered. Specifically, a connection line between the first connecting end 541*b* and the second connecting end 541*c* may be parallel to the second direction, that is, perpendicular to the first direction. A connection line between the first connecting end 541*b* and the second connecting end 541*c* may also be non-parallel to the second direction, that is, intersecting with but not perpendicular to the first direction.

In addition, the foregoing conductive layer 542 may include conductive foam. The conductive foam has good surface conductivity and is made of a very light material. Therefore, the metal support 541 can be electrically connected to the camera circuit board 530, and a weight of the electronic device 10 can also be reduced. Moreover, the conductive foam is relatively cheap, which helps reduce costs.

Alternatively, the foregoing conductive layer 542 may be further made of a high dielectric material or a wave-absorbing material. The use of the high dielectric material and the wave-absorbing material helps realize a ground effect at a high frequency, and can further ensure desirable conductivity between the camera circuit board 530 and the metal support 541. In other words, it is ensured that the camera circuit board 530 is desirably connected to the ground terminal of the circuit board 300.

Figure 13:
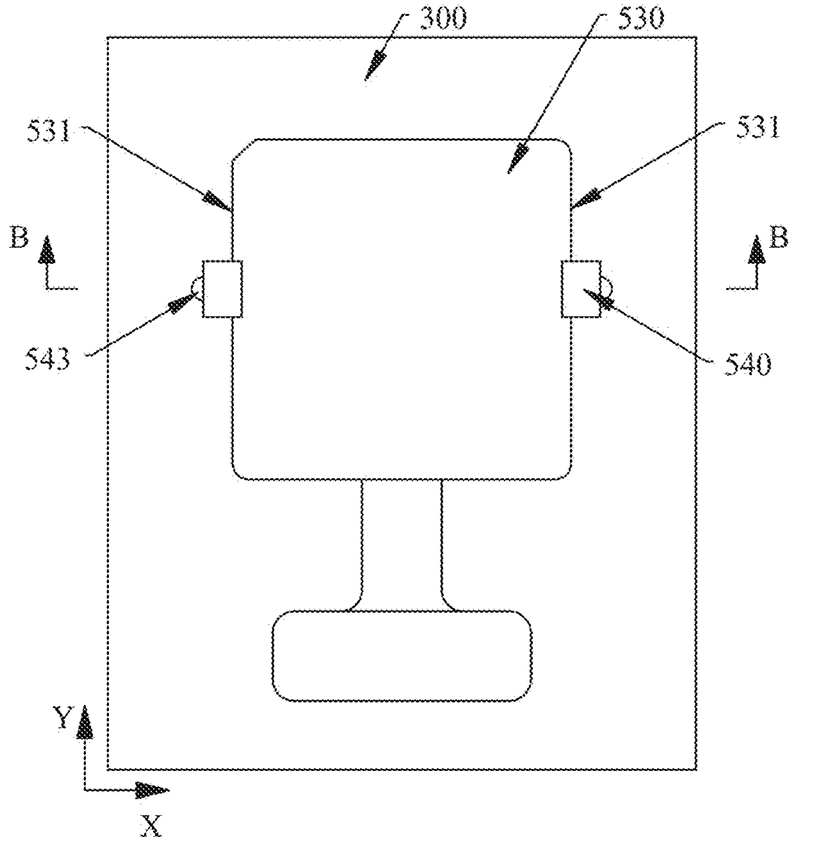
FIG. 13 is a structural diagram of another camera module according to an embodiment of this application.
Figure 14:
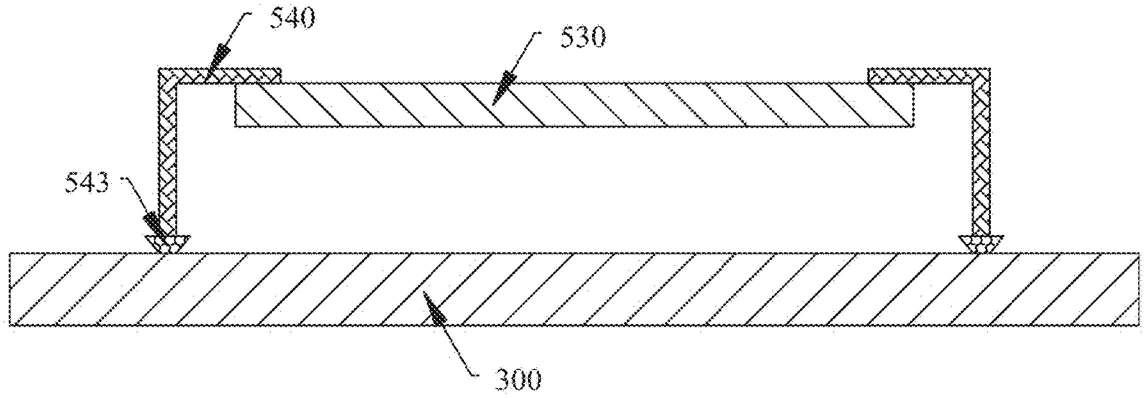
FIG. 14 is a cross-sectional view taken along line B-B in FIG. 13.

Based on this, to further improve the interference suppression effect of the camera module 500 and improve the shooting effect of the camera module 500, reference is made to FIG. 13 and FIG. 14. FIG. 13 is a structural diagram of another camera module 500 according to an embodiment of this application. FIG. 14 is a cross-sectional view taken along line B-B in FIG. 13. The foregoing camera module 500 further includes a matching member 543. The matching member 543 is connected in series between a ground member 540 and a ground terminal of a circuit board 300. The matching member 543 is configured to adjust a resonance frequency of the camera module 500. In other words, a resonance point of an antenna coupled to the camera module 500 is adjusted by adjusting a size of the matching member 543, so that the resonance frequency of the camera module 500 significantly deviates from a sensitive key band (for example, an N78 band), thereby realizing a better interference suppression effect and helping further improve a shooting effect of the camera module 500.

In some embodiments, the foregoing matching member 543 may include a capacitor and an inductor. Alternatively, the matching member 543 may also include the capacitor and the inductor. The capacitor and the inductor are connected in parallel with each other, and the capacitor and the inductor connected in parallel with each other are connected in series between the ground member 540 and the ground terminal of the circuit board 300. In this way, the adjustment of the resonance point of the camera module 500 is realized, to achieve a better interference suppression effect of the camera module 500.

Table 2 below shows simulation test results of the camera module 500 provided with the foregoing ground member 540 (including the metal support 541, the conductive layer 542, and the matching member 543), the camera module 500 provided with the ground member 540 (including the metal support and the conductive layer, and not provided with the matching member 543), and the camera module 500 not provided with the ground member 540.

It may be learned from the foregoing Table 2 that, compared with a grounding solution, the isolation of the camera module 500 can be improved by arranging the ground member 540 on the camera module 500, that is, mounting the conductive layer 542 and the metal support 541 to the camera circuit board 530, and electrically connecting the metal support 541 to the ground terminal of the circuit board 300. A solution of connecting the matching member 543 in series between the metal support 541 and the circuit board 300 can further improve the isolation of the camera module 500 compared with a solution in which the matching member 543 is not arranged, thereby helping further improve the interference suppression effect of the camera module 500.

Figure 15:
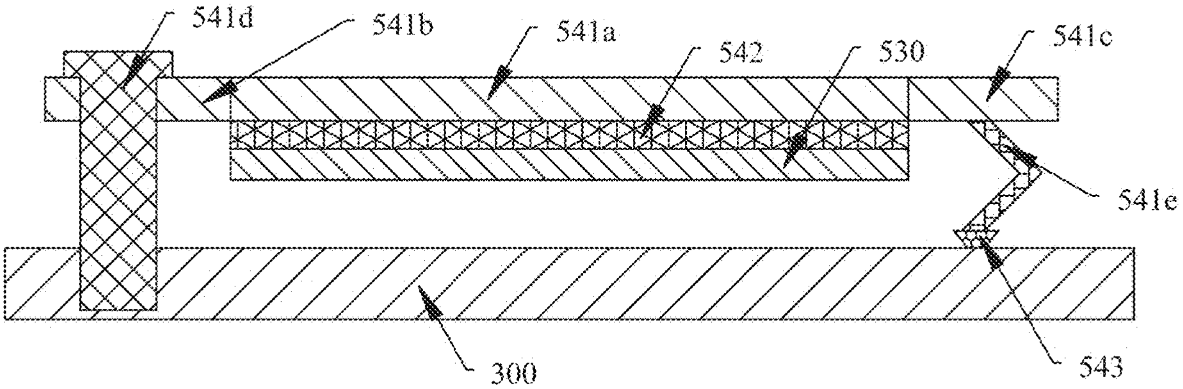
FIG. 15 is a diagram showing a connection structure between a camera circuit board and a matching member and between a circuit board and a matching member according to an embodiment of this application.

For example, refer to FIG. 15. FIG. 15 is a diagram showing a connection structure between a camera circuit board 530 and a matching member 543 and between a circuit board 300 and the matching member according to an embodiment of this application. The matching member 543 may be connected in series between the metal elastic piece 541*e* and a ground terminal of the circuit board 300. For example, a capacitor is connected in series between the metal elastic piece 541*e* and the ground terminal of the circuit board 300. Then a resonance point of a camera module 500 can be adjusted by connecting capacitors of different sizes in series between the metal elastic piece 541*e* and the ground terminal of the circuit board 300, that is, adjusting the size of the capacitors, thereby preventing the antenna of the electronic device 10 from being strongly coupled to the camera module 500 when transmitting a signal.

Figure 16:
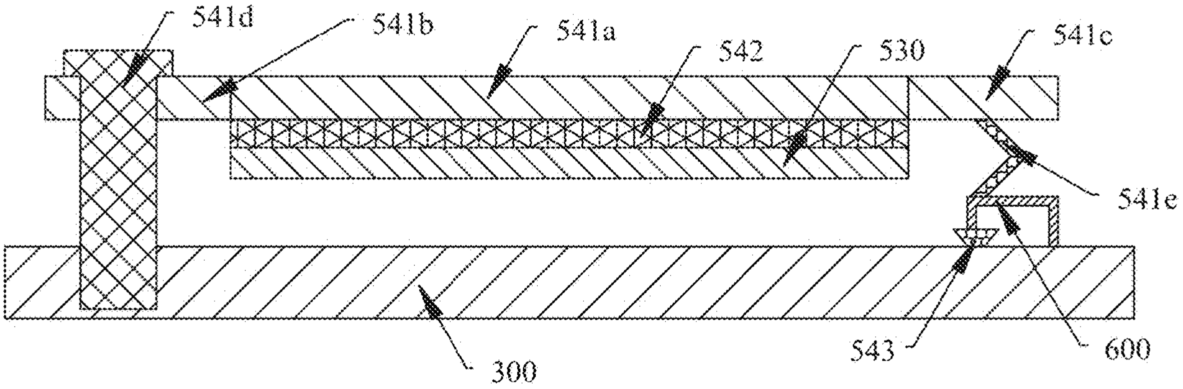
FIG. 16 is a diagram showing a connection structure between another camera circuit board and a matching member and between a circuit board and a matching member according to an embodiment of this application.

In some other embodiments, refer to FIG. 16. FIG. 16 is a diagram showing a connection structure between another camera circuit board 530 and a circuit board 300 and between another camera circuit board and a matching member 543 according to an embodiment of this application. The foregoing matching member 543 may be further connected in series between a shielding cover 600 and a ground terminal of the circuit board 300. Then a second connecting end 541*c* may also be electrically connected to a ground terminal of the circuit board 300 by causing a metal elastic piece 541*e* to abut against the shielding cover 600, and then the camera circuit board 530 is electrically connected to the ground terminal of the circuit board 300 through a metal support 541.

Specifically, the metal elastic piece 541*e* may be fixedly connected to the second connecting end 541*c* by welding and fixation, and the metal elastic piece 541*e* may be fixedly connected to the shielding cover 600 by welding and fixation. On the one hand, an electrical connection between the second connecting end 541*c* and the shielding cover 600 can be realized. On the other hand, connection strength between

TABLE 2

| MIPI | State | 0A | 0B | 0C | 1A | 1B | 1C | 2A | 2B | 2C | Worst case | Mean value | Improvement |
|---|---|---|---|---|---|---|---|---|---|---|---|---|---|
| Simulation isolation | Not grounded | −23.2 | −22.6 | −22.8 | −23.3 | −24.8 | −25.6 | −26.6 | −27.1 | −29.3 | −22.6 | | |
| | Two points grounded | −35.2 | −38.2 | −37.4 | −37.7 | −42 | −39.6 | −39.4 | −41.6 | −39.9 | −35.2 | | 12.6 |
| | Matching member grounded | −41.9 | | | | −48.3 | | | | −45.7 | −41.9 | | 19.3 |

the metal elastic piece 541*e* and the second connecting end 541*c* and between the metal elastic piece and the shielding cover 600 can be improved.

In the descriptions of this specification, the specific features, structures, materials, or characteristics may be combined in a proper manner in any one or more of embodiments or examples.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A camera module, applied to an electronic device, and comprising:

a lens;

a camera circuit board, fixed to the lens;

a ground member, arranged on the camera circuit board and electrically connected to the camera circuit board, wherein the ground member is electrically connected to a ground terminal of a circuit board of the electronic device; and a matching member connected in series between the ground member and the ground terminal of the circuit board of the electronic device, the matching member being configured to adjust a resonance frequency of the camera module.

2. The camera module according to claim 1, further comprising:

a connection structure, wherein a first end of the connection structure is electrically connected to the camera circuit board, and a second end of the connection structure is electrically connected to the circuit board of the electronic device; a distribution direction of the connection structure and the camera circuit board is a first direction, and two edges distributed on the camera circuit board along a direction perpendicular to the first direction are first edges; and the ground member extends out of the camera circuit board from each of the first edges, and is electrically connected to the ground terminal of the circuit board of the electronic device.

3. The camera module according to claim 2, wherein a conductive region is formed on a surface of the camera circuit board away from the lens, the ground member is attached to the conductive region and is electrically connected to the camera circuit board, and the ground member extends out of the camera circuit board from the first edge, and is electrically connected to the ground terminal of the circuit board of the electronic device.

4. The camera module according to claim 3, wherein the conductive region comprises a ground layer of the camera circuit board.

5. The camera module according to claim 3, wherein two ends of the ground member extend out of the camera circuit board respectively from the two first edges, and are electrically connected to the ground terminal of the circuit board of the electronic device.

6. The camera module according to claim 2, wherein the ground member comprises a conductive fabric or a copper sheet.

7. The camera module according to claim 6, wherein the ground member extends out of the camera circuit board along a direction away from the camera circuit board from the first edge, and is in contact with and electrically connected to an adjacent shielding cover; and the shielding cover is electrically connected to the ground terminal of the circuit board of the electronic device.

8. The camera module according to claim 7, wherein the two ends of the ground member respectively extend in opposite directions from the two first edges, and extend out of the camera circuit board, an end of the ground member is in contact with and electrically connected to the adjacent shielding cover, the shielding cover is electrically connected to the ground terminal of the circuit board of the electronic device, and an other end of the ground member is in contact with and electrically connected to the ground layer of the circuit board of the electronic device.

9. The camera module according to claim 2, wherein the ground member comprises a metal support and a conductive layer, the metal support is arranged on a side of the camera circuit board away from the lens, the conductive layer is arranged between the metal support and the camera circuit board, and the metal support is electrically connected to the camera circuit board through the conductive layer, and the metal support is electrically connected to the ground terminal of the circuit board of the electronic device.

10. The camera module according to claim 9, wherein the metal support body comprises:

a support body, attached to the conductive layer;

a first connecting end, fixedly connected to the support body, wherein the first connecting end extends out of the camera circuit board from each of the first edges; and a fastener, wherein the first connecting end and the circuit board of the electronic device are fixedly connected through the fastener, and the first connecting end is electrically connected to the ground terminal of the circuit board of the electronic device through the fastener.

11. The camera module according to claim 10, wherein the fastener is a screw.

12. The camera module according to claim 10, wherein the metal support further comprises:

a second connecting end, fixedly connected to the support body, wherein a connection line between the second connecting end and the first connecting end intersects a straight line where the first direction is located; and a metal elastic piece, wherein an end of the metal elastic piece is connected to the second connecting end, and an other end thereof is electrically connected to the ground terminal of the circuit board of the electronic device.

13. The camera module according to claim 12, wherein a shielding cover is arranged between the metal elastic piece and the circuit board of the electronic device, the shielding cover is electrically connected to the ground terminal of the circuit board of the electronic device, and the metal elastic piece is electrically connected to the shielding cover.

14. The camera module according to claim 9, wherein the conductive layer comprises conductive foam.

15. The camera module according to claim 9, wherein the conductive layer comprises a high dielectric material or a wave-absorbing material.

16. The camera module according to claim 1, wherein the matching member comprises a capacitor and an inductor, the capacitor and the inductor are connected in parallel with each other, and the capacitor and the inductor connected in parallel with each other are connected in series between the ground member and the ground terminal of the circuit board of the electronic device.

17. The camera module according to claim 1, comprising a front camera module.

18. An electronic device, comprising:

a housing;

a circuit board, arranged inside the housing; and a camera module comprising:

a lens;

a camera circuit board, fixed to the lens; and a ground member, arranged on the camera circuit board and electrically connected to the camera circuit board, wherein the ground member is electrically connected to a ground terminal of a circuit board of the electronic device, wherein:

the camera module is arranged inside the housing, and a ground member of the camera module is electrically connected to a ground terminal of the circuit board, the camera module comprises a camera circuit board and a connection structure, an end of the connection structure is electrically connected to the camera circuit board, and another end of the connection structure is electrically connected to the circuit board, and physical dimensions of the camera circuit board and the connection structure along a distribution direction are approximately a quarter wavelength of an operating band of an antenna of the electronic device.

* * * * *